No. 820,686. PATENTED MAY 15, 1906.
J. D. WALKER.
TRAP.
APPLICATION FILED SEPT. 19, 1905.

2 SHEETS—SHEET 1.

Witnesses
J. C. Simpson
F. C. Jones

Inventor
John D. Walker.
By Chandler & Chandler
Attorneys

No. 820,686. PATENTED MAY 15, 1906.
J. D. WALKER.
TRAP.
APPLICATION FILED SEPT. 19, 1905.

2 SHEETS—SHEET 2.

Witnesses
J. C. Simpson.
F. C. Jones.

Inventor
John D. Walker
By Chandler & Chandler
Attorneys

UNITED STATES PATENT OFFICE.

JOHN D. WALKER, OF PINERIDGE, LOUISIANA, ASSIGNOR TO PINE RIDGE NEW IDEA COMPANY, OF PINERIDGE, LOUISIANA.

TRAP.

No. 820,686.  Specification of Letters Patent.  Patented May 15, 1906.

Application filed September 19, 1905. Serial No. 279,154.

*To all whom it may concern:*

Be it known that I, JOHN D. WALKER, a citizen of the United States, residing at Pineridge, in the parish of Winn, State of Louisiana, have invented certain new and useful Improvements in Traps; and I do hereby declare the following to be a full, clear, and exact description of the invention, such as will enable others skilled in the art to which it appertains to make and use the same.

This invention relates to gopher-traps.

One object of the invention is to provide a trap embodying such characteristics that the trap will operate automatically upon contact therewith by the gopher.

Another object resides in the provision of an exceedingly simple, inexpensive, durable, and efficient trap so constructed and arranged that it may be placed at the hole of the gopher and operated by the latter in the event that he should attempt to leave his hole.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be resorted to within the scope of the claims.

Figures 1, 2:
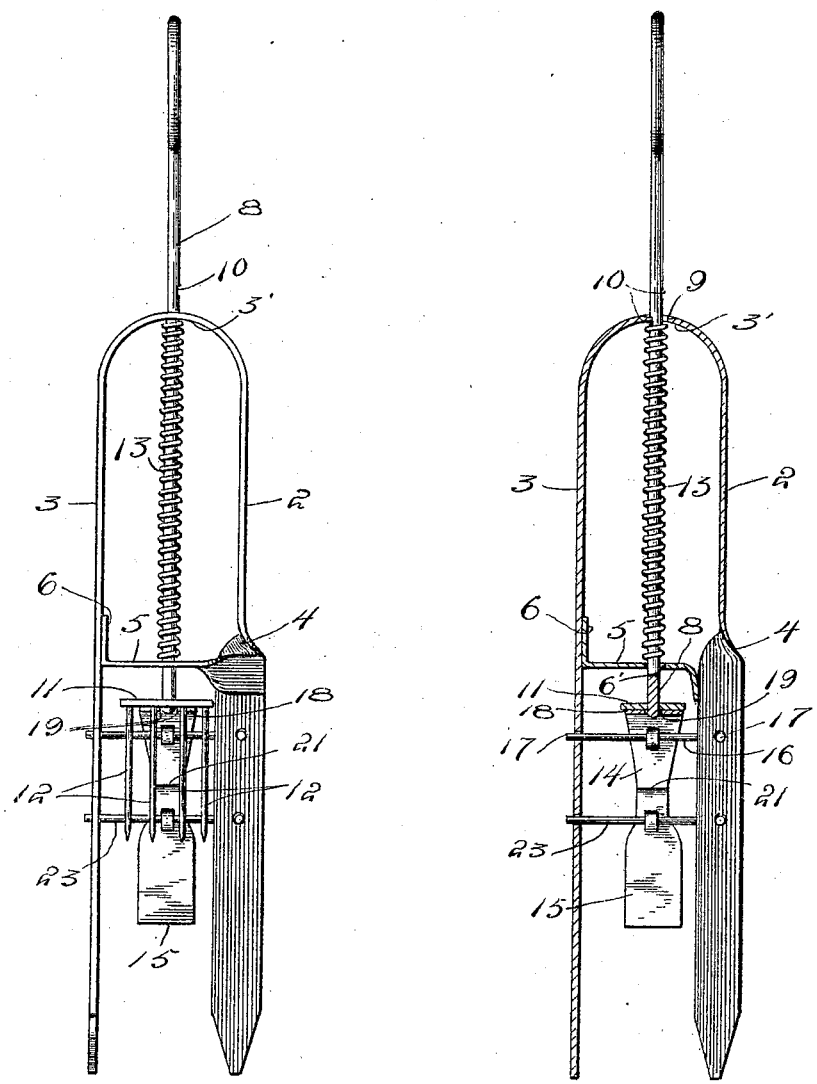
Figure 3:
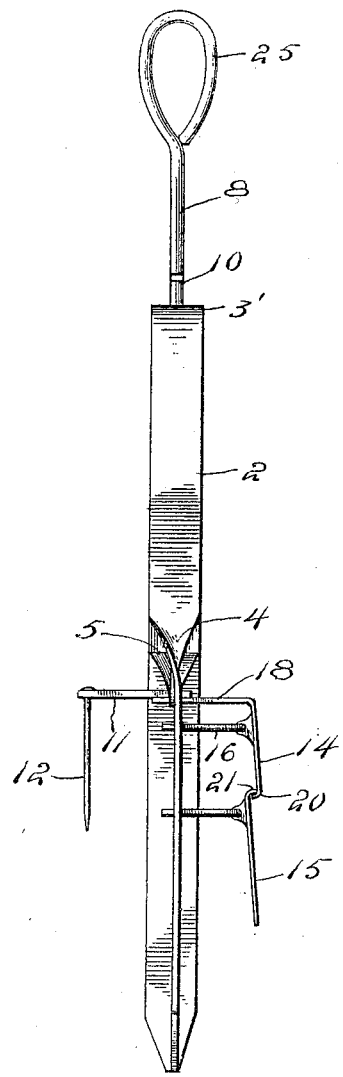
Figure 4:
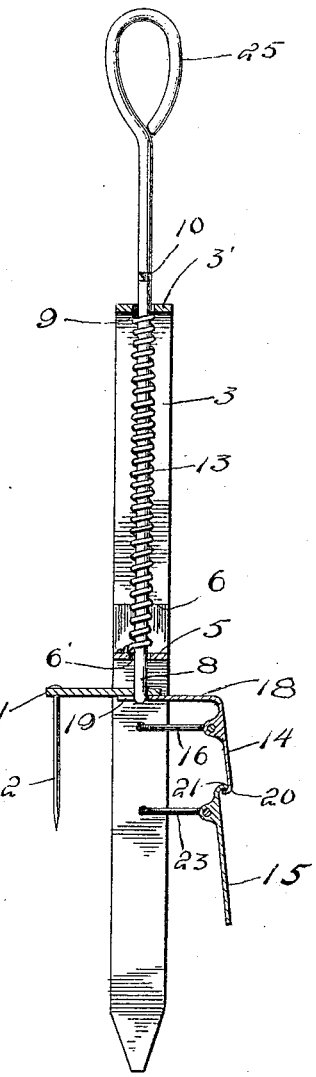

In the drawings, Figure 1 is a front elevation of my invention. Fig. 2 is a vertical section with parts of the structure in elevation. Fig. 3 is a side elevation with the parts set. Fig. 4 is a longitudinal section at right angles to Fig. 2.

Referring now more particularly to the accompanying drawings, the invention comprises an inverted-U-shaped frame including legs 2 and 3 and a bight portion 3'. The leg 2 is twisted intermediate its ends, as indicate by the character 4, and one end of an intermediate brace 5 is connected to this twisted portion 4, with its opposite end bent upwardly, as at 6, and connected to the inner face of the opposite leg 3. The brace 5 is provided with a perforation 6 intermediate its ends to permit of a sliding movement therethrough of the plunger 8, which also slides through the perforation 9 in the bight porton 3' of the frame, there being a notch 10 formed in one side of the plunger near its upper end for engagement with one side of the perforation 9 to hold the plunger in the elevated position while the trigger mechanism of the trap is being adjusted. Secured to the lower end of the plunger 8 is a laterally-directed head 11, provided at its edge opposite the edge connected to the plunger with depending tines 12, which are designed to impale the animal when he attempts to leave his hole. The engagement of the latch 10 with one side of the perforation 9 of the frame is not the only means to hold the plunger in its elevated position against the action of the helical spring 13, which latter encircles the plunger between the brace 5 and the said notch 10, for I also employ a catch-lever 14 in connection with a trigger 15. The catch-lever 14 is in angle form and mounted fixedly upon a curved shaft 16, whose ends 17 are journaled for rotation in the sides or legs 2 and 3 of the frame. The portion 18 of the catch-lever is bifurcated, as indicated by the character 19, so as to provide fingers adapted to engage the under face of the head 11 to hold the latter and the plunger in raised position when its opposite hooked end 20 is engaged with the hooked end 21 of the trigger 15, the catch-lever and trigger cooperating with each other to aid in holding the plunger in its elevated position until the trigger springs the trap when contacted with by the gopher. The trigger, like the catch-lever, is mounted upon a curved shaft or rod 23, whose ends are journaled in the legs 2 and 3 directly beneath the aforesaid curved shaft or rod 16.

The use of the invention should now be well understood. However, as shown, the legs have their lower ends pointed, so that they may be readily engaged in the ground upon opposite sides of the animal's hole 24. As shown in full lines, the trigger and catch-lever are engaged together with the latter in engagement with the under face of the impaling-head and the trigger directly in front of the hole. It is obvious, therefore, that in the event the gopher or other animal attempts to leave the hole he will contact with the trigger and cause the latter to become disengaged from the catch-lever. As soon as this disengagement of the said parts takes place the helical spring encircling the plunger will cause the latter and its impaling-head to plunge downwardly with terrific force causing the tines 12 to pierce the animal and hold him fast. The loop 25 at the upper end of the plunger limits downward movement of the latter.

What is claimed is—

1. A device of the class described comprising a frame, a spring-actuated plunger mounted in the frame, an impalement element carried by the plunger and extending rearwardly of the frame, and means located forwardly of the frame to hold the plunger in elevated position and to release it.

2. A device of the class described comprising a frame, a spring-pressed plunger mounted in the frame, a plate carried at the lower end of said plunger and extending rearwardly of said casing, impalement-tines carried by the plate, and means located forward of the casing and engaged with the plate to hold the said plunger in elevated position and to release it.

3. A device of the class described comprising a frame, a spring-pressed plunger mounted in the frame, a plate carried at the lower end of said plunger and extending rearwardly of said casing, impalement-tines carried by the plate, and plates mounted forwardly of said frame and having interlocking meeting ends, one of said plates having a portion extending rearwardly for engagement beneath said first-named plate when the plunger is in elevated position.

In testimony whereof I affix my signature in presence of two witnesses.

JOHN D. WALKER.

Witnesses:
F. C. JONES,
J. D. BLACK.